(12) United States Patent
Shono (10) Patent No.: US 6,720,912 B2
(45) Date of Patent: Apr. 13, 2004

(54) SINGLE-ANTENNA TIME DIVISION CONTROL TYPE FM-CW RADAR

(75) Inventor: Masayoshi Shono, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/149,482

(22) PCT Filed: Oct. 12, 2001

(86) PCT No.: PCT/JP01/09013
§ 371 (c)(1),
(2), (4) Date: Jun. 11, 2002

(87) PCT Pub. No.: WO02/31531
PCT Pub. Date: Apr. 18, 2002

(65) Prior Publication Data
US 2002/0180635 A1 Dec. 5, 2002

(30) Foreign Application Priority Data
Oct. 12, 2000 (JP) ............................. 2000-312173

(51) Int. Cl.⁷ ..................... G01S 13/00; G01S 13/58
(52) U.S. Cl. ..................... 342/198; 342/70; 342/109
(58) Field of Search ................... 342/70, 109, 128, 342/129, 198

(56) References Cited

U.S. PATENT DOCUMENTS 5,973,636 A * 10/1999 Okubo et al. ............. 342/70
6,037,895 A 3/2000 Uehara
6,384,768 B1 * 5/2002 Kai ............................. 342/70

FOREIGN PATENT DOCUMENTS

| EP | 0 744 628 A2 | 11/1996 |
| EP | 0 795 761 A2 | 9/1997 |
| JP | 63-147043 | 9/1988 |
| JP | 5-8480 | 2/1993 |
| JP | 5-11079 | 2/1993 |
| JP | 2000-147087 A | 5/2000 |

OTHER PUBLICATIONS

International Search Report of PCT/JP01/09013, dated Nov. 6, 2001.

* cited by examiner

Primary Examiner—Thomas H. Tarcza
Assistant Examiner—Brian Andrea
(74) Attorney, Agent, or Firm—Christie, Parker & Hale, LLP (57) ABSTRACT

In a single-antenna time division control type FM-CW radar, an amplifier is provided in each signal path in a transmitting system and a receiving system, and the amplifier provided in the transmitting system and the amplifier provided in the receiving system are operated alternately in synchronism with transmit and receive timings, to perform switching between transmission and reception. The operation of the amplifiers is controlled by controlling the gain of each of the amplifiers. This configuration provides enhanced isolation between the transmitting and receiving systems, and prevents transmitting power from leaking into the receiving system through a transmit-receive switching section.

7 Claims, 11 Drawing Sheets

(a) IF SIGNAL (b) BEAT SIGNAL

SINGLE-ANTENNA TIME DIVISION CONTROL TYPE FM-CW RADAR

CROSS-REFERENCE TO RELATED APPLICATION

This application claims priority of International application number PCT/JP01/09013, filed Oct. 12, 2001, which in turn claims priority of Japanese application number 2000-312173, filed Oct. 12, 2000

TECHNICAL FIELD

The present invention relates to transmit-receive switching in a single-antenna time division control type FM-CW radar and, more particularly, to a means for providing reliable isolation between transmitting and receiving systems.

BACKGROUND ART

FM-CW radar is used as a radar system for measuring distance and relative velocity with respect to a target object. Since FM-CW radar can measure the distance and the relative velocity of a vehicle traveling in front by using a simple signal processing circuit, and as its transmitter and receiver can be constructed with simple circuitry, this type of radar is used as an automotive collision avoidance radar.

The principle of FM-CW radar is as follows. An oscillator is frequency-modulated, for example, by a triangular wave of several hundred hertz, and the frequency-modulated wave is transmitted; then, a reflected signal from a target object is received, and the received signal is frequency-demodulated using the frequency-modulated wave as the local frequency. Here, the reflected wave from the target is shifted in frequency from the transmitted signal (i.e., produces a beat) according to the distance between the radar and the target and also to the Doppler shift due to the relative velocity of the target. Accordingly, the distance and the relative velocity of the target object can be measured from this frequency shift.

In an FM-CW radar system, a triangular wave is often used as the modulating signal, and the description given herein deals with the case where a triangular wave is used as the modulating signal, but it will be appreciated that a modulating wave of other shape, such as a sawtooth wave or a trapezoidal wave, can be used instead of the triangular wave.

Figure 1:
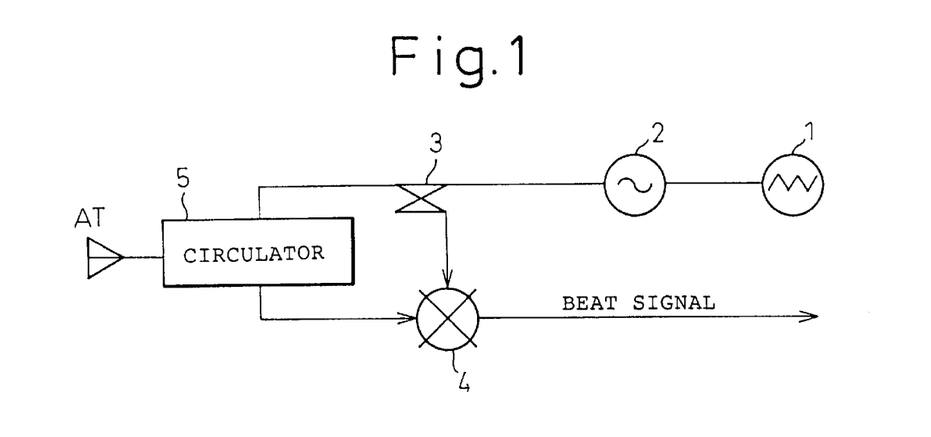
FIG. 1 is a diagram showing the configuration of a single-antenna FM-CW radar.

FIG. 1 is a diagram showing the configuration of a single-antenna FM-CW radar. As shown in FIG. 1, a modulating signal generator 1 applies a modulating signal to a voltage-controlled oscillator 2 for frequency modulation, and the frequency-modulated wave is passed through a circulator 5 and transmitted out from the antenna AT. The signal thus transmitted out and reflected from a target object, such as a vehicle traveling in front, is received by the antenna AT, and the received signal is input to a frequency converter 4 via the circulator 5. In the frequency converter 4, the input signal is mixed with a local signal separated by a directional coupler 3 from the output of the voltage-controlled oscillator 2, to produce a beat signal.

Figure 2:
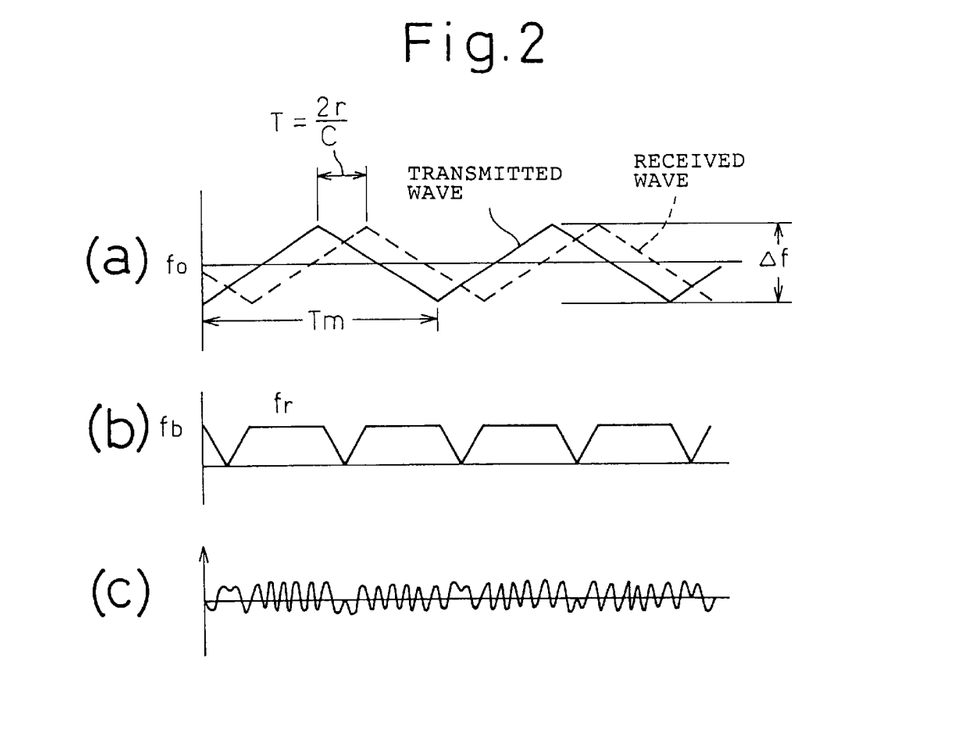
FIGS. 2(a), 2(b) and 2(c) are diagrams for explaining the principle of FM-CW radar.

FIG. 2 is a diagram for explaining the principle of FM-CW radar when the relative velocity with respect to the target object is zero. In this case, the transmitted wave is a triangular wave whose frequency changes as shown by a solid line in part (a) of FIG. 2. In the figure, $f_0$ is the center frequency of the transmitted wave, $\Delta f$ is the FM modulation amplitude, and Tm is the repetition period. The transmitted wave is reflected from the target object and received by the antenna; the received wave is shown by a dashed line in part (a) of FIG. 2. The round trip time of the radio wave to and from the target object is given by T=2r/C, where r is the distance to the target object and C is the velocity of propagation of the radio wave.

Here, the received wave is shifted in frequency from the transmitted signal (i.e., produces a beat) according to the distance between the radar and the target object. The beat frequency component fb can be expressed by the following equation.

$$fb = fr = (4 \cdot \Delta f / C \cdot Tm) r \tag{1}$$

Figure 3:
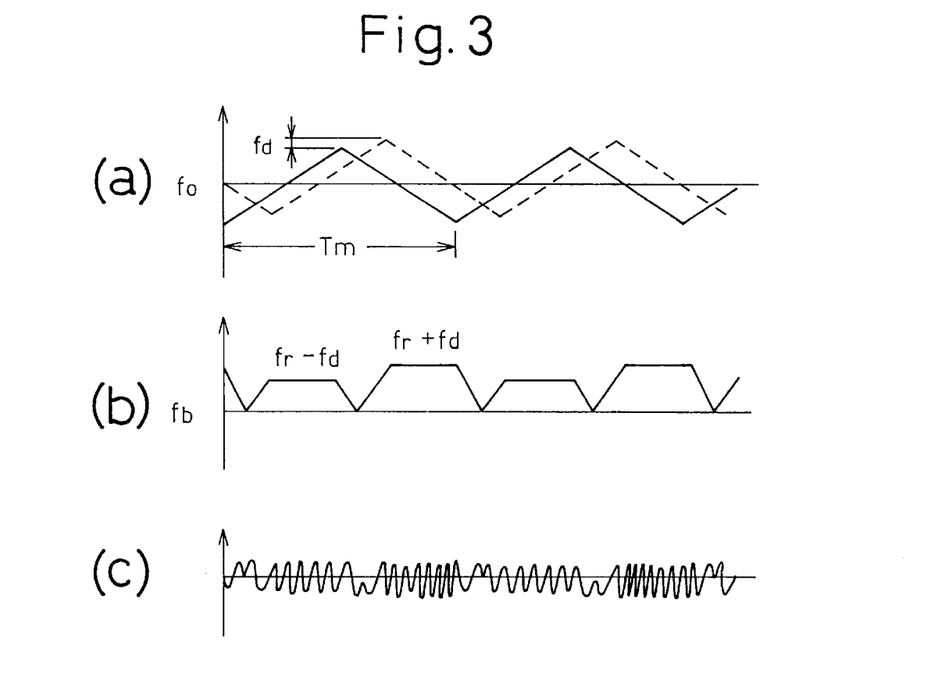
FIGS. 3(a), 3(b) and 3(c) are diagrams for further explaining the principle of FM-CW radar.

FIG. 3, on the other hand, is a diagram for explaining the principle of FM-CW radar when the relative velocity with respect to the target object is v. The frequency of the transmitted wave changes as shown by a solid line in part (a) of FIG. 3. The transmitted wave is reflected from the target object and received by the antenna; the received wave is shown by a dashed line in part (a) of FIG. 3. Here, the received wave is shifted in frequency from the transmitted signal (i.e., produces a beat) according to the distance between the radar and the target object. In this case, since the relative velocity with respect to the target object is v, a Doppler shift occurs, and the beat frequency component fb can be expressed by the following equation.

$$fb = fr \pm fd = (4 \cdot \Delta f / C \cdot Tm) r \pm (2 \cdot f_0 / C) v \tag{2}$$

The symbols in the above equations (1) and (2) have the following meanings.

fb: Transmit/receive beat frequency
fr: Range (distance) frequency
fd: Velocity frequency
$f_0$: Center frequency of transmitted wave
$\Delta f$: Frequency modulation amplitude
Tm: Period of modulated wave
C: Velocity of light (velocity of radio wave)
T: Round trip time of radio wave to and from target object
r: Range (distance) to target object
v: Relative velocity with respect to target object Thus, the distance and the relative velocity with respect to the target object can be obtained from the above equation (1) or (2).

Here, consider the beat signal power; then, the receiving power, Pr, of the antenna can be expressed by $$Pr = \{(G^2 \cdot \lambda^2 \cdot \sigma \cdot Pt)/((4\pi)^3 \cdot r^4)\} \cdot La \tag{3}$$

and the beat output power Pb by $$Pb = Pr \cdot Cmix \tag{4}$$

The symbols in the above equations (3) and (4) have the following meanings.

G: Antenna gain
$\lambda$: Wavelength
$\sigma$: Reflecting object area
Pt: Transmitting power
r: Range to target object
Cmix: Conversion loss in mixer On the other hand, a single-antenna time division control type FM-CW radar uses a single antenna as a transmitting/receiving antenna AT, which is switched between transmission and reception by time division control with a transmit-receive switching section comprising a switching means.

However, in the case of the single-antenna time division control type FM-CW radar, since the timing is switched alternately between transmission and reception, the transmitting power may leak into the receiving system through the transmit-receive switching section. This can cause such problems as saturation gain compression of the receiving system, increased leakage of the transmit-receive switching frequency into the receiving system, and increased FM-AM conversion noise.

Accordingly, it is an object of the present invention to provide increased isolation between the transmitting and receiving systems in a single-antenna time division control type FM-CW radar and thereby prevent the transmitting power from leaking into the receiving system through the transmit-receive switching section.

DISCLOSURE OF THE INVENTION

The present invention provides a single-antenna time division control type FM-CW radar which comprises a transmitting/receiving antenna and a transmit-receive switching section and performs switching between transmission and reception by time division, wherein an amplifier is provided in each signal path in a transmitting system and a receiving system, including the transmit-receive switching section, and control means is provided for alternately causing the amplifier provided in the transmitting system and the amplifier provided in the receiving system to operate in synchronism with transmit and receive timings, thereby performing the switching between transmission and reception.

The operation of the amplifiers is controlled by controlling the gain of each of the amplifiers. The amplifiers can be made to switch on and off.

The amplifiers are connected in a multiple stage configuration, and the amplifiers connected in a multiple stage configuration are provided at a plurality of locations along each signal path in the transmitting system and the receiving system.

A multiplier is provided in series with the amplifier in a local signal separator provided in the signal path of the transmitting system, and the multiplier may be switched on and off to perform the switching between transmission and reception in conjunction with the amplifier.

A passive device can be used as the transmit-receive switching section, and a hybrid circuit or a Y-shaped power distributor can be used as the passive device.

ADVANTAGEOUS EFFECT OF THE INVENTION

In the single-antenna time division control type FM-CW radar of the present invention, as an amplifier is provided in each signal path in the transmitting system and the receiving system, and as the transmitting and receiving systems are isolated from each other by turning the amplifiers on and off by varying the bias voltage applied to the amplifiers, reliable isolation can be provided between the transmitting and receiving systems. Furthermore, when the amplifiers are connected in multiple stages and provided at a plurality of locations along each signal path in the transmitting system and the receiving system, isolation between the transmitting and receiving systems becomes more reliable and easier to adjust.

Further, as a passive device such as a hybrid circuit or a Y-shaped power distributor is used in the transmit-receive switching section, not only can the power consumption be reduced, but the need to use a switch in the transmit-receive switching section can be eliminated; as a result, there is no need to use ICs having different bias conditions, and the amount of bias circuitry can be reduced, achieving a cost reduction.

Furthermore, when a multiplier is used to perform switching between transmission and reception, or when an amplifier (A1, A2) is provided in front of the multiplier and operated at a low frequency band, isolation between the transmitting and receiving systems can be achieved efficiently.

By providing the isolation between the transmitting and receiving systems as described above, it becomes possible to obtain a proper receiving gain, reduce FM-AM conversion noise as well as the leakage of the switching frequency to the beat signal, and improve the S/N ratio of the receiver. This serves to improve the detection performance of the radar.

DETAILED DESCRIPTION OF THE INVENTION

The present invention will be described in further detail below with reference to drawings.

Figure 4:
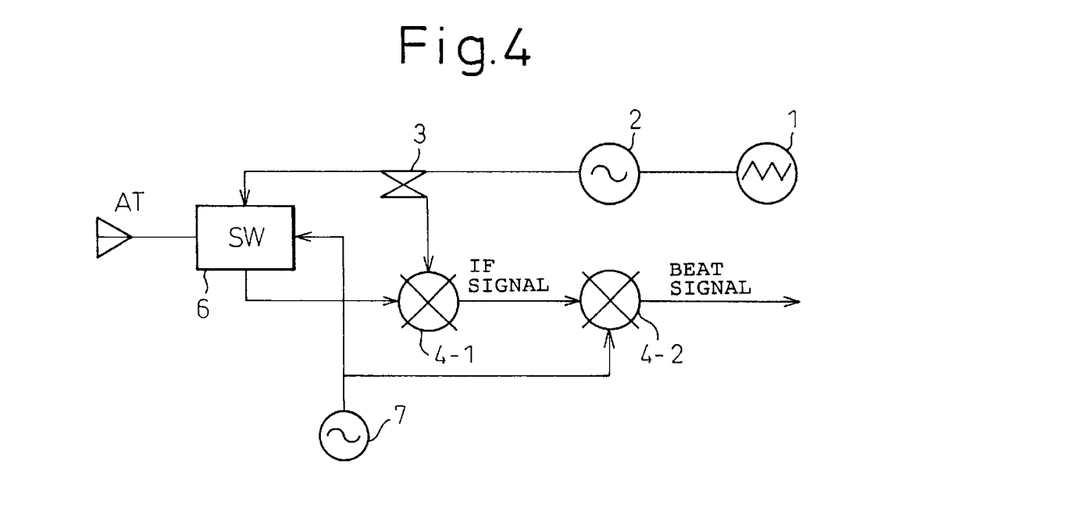
FIG. 4 is a diagram showing the configuration of a single-antenna time division control type FM-CW radar to which the present invention is applied.

FIG. 4 is a diagram showing the configuration of a single-antenna time division control type FM-CW radar. As shown in FIG. 4, a single antenna is used as a transmitting/receiving antenna AT, and a transmit-receive switching section 6 comprising a switching means switches the antenna between transmission and reception by time division control. At the receiving side are provided a first frequency converter 4-1 and a second frequency converter 4-2.

A modulating signal generator 1 applies a modulating signal to a voltage-controlled oscillator 2 for frequency modulation, and the frequency-modulated output passes through the transmit-receive switching section 6 and is transmitted out from the antenna AT. Reference numeral 7 is a modulating signal generator which generates a modulating signal of frequency fsw for switching the transmit-receive switching section 6.

The signal reflected from a target object such as a vehicle traveling in front is received by the transmitting/receiving antenna AT and input via the transmit-receive switching section 6; the input signal is mixed in the first frequency converter 4-1 with a local signal separated by a directional coupler 3 from the output of the voltage-controlled oscillator 2, to produce an IF signal. The signal output from the first frequency converter 4-1 is mixed in the second frequency converter 4-2 with the signal of frequency fsw generated by the modulating signal generator 7, and is thus downconverted to produce a beat signal which carries information on the distance and relative velocity of the target object.

Figure 5:
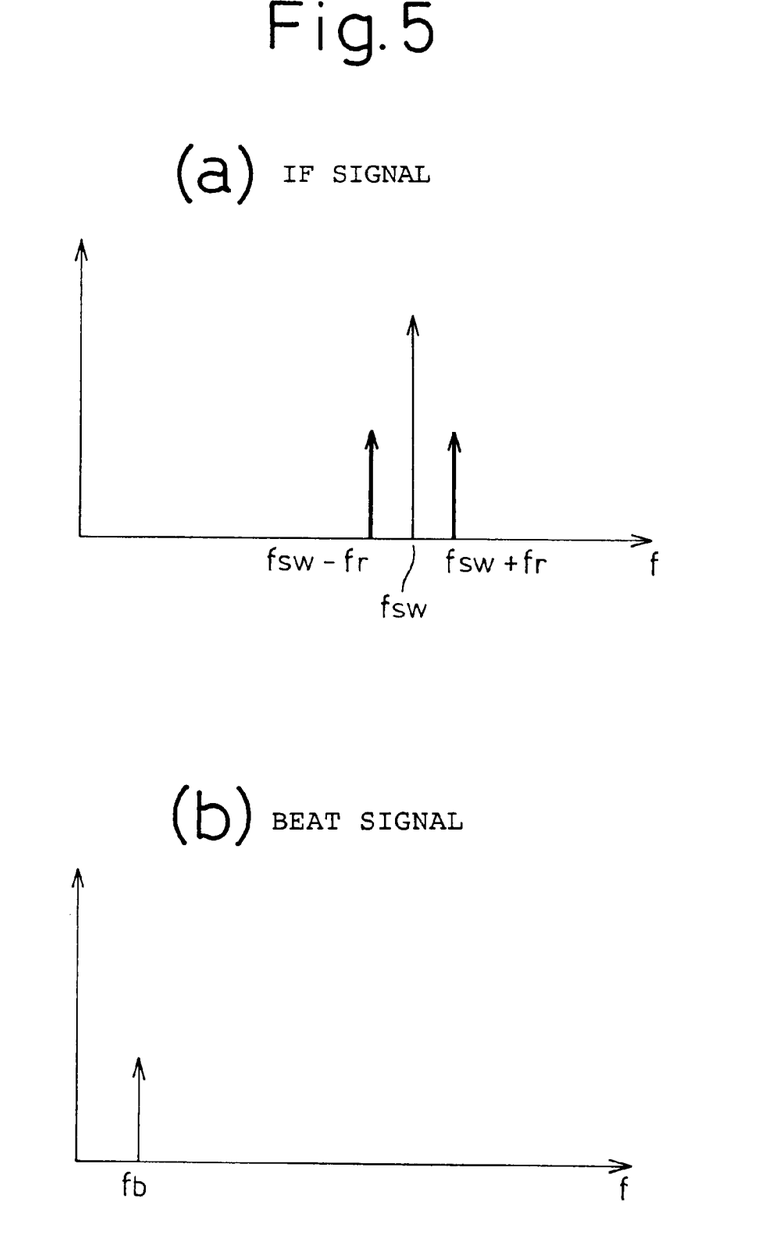
FIG. 5(a) is a diagram showing the frequency spectrum of an IF signal and FIG. 5(b) is a diagram showing the frequency spectrum of a beat signal, both for the single-antenna time division control type FM-CW radar shown in FIG. 4.

FIG. 5 is a diagram showing one example of the frequency spectrum of the IF signal output from the first frequency converter 4-1 in the single-antenna time division control type FM-CW radar system of FIG. 4, and one example of the frequency spectrum of the beat signal output from the second frequency converter 4-2. As shown in FIG. 5(a), the frequency spectrum of the IF signal consists of the frequency fsw and its sideband frequencies fsw±fr. Here, fsw is the switching frequency of the transmit-receive switching section 6, and fr is the frequency due to the distance (range) to the target object when the relative velocity is zero. The greater the distance to the target object, the farther the sideband frequencies are spaced away from fsw. This output signal is mixed in the second frequency converter 4-2 with the signal of frequency fsw and downconverted to a frequency equal to the difference between the frequencies fsw and fswffr, to extract the beat signal having the frequency spectrum fb shown in FIG. 5(b).

Figure 6:
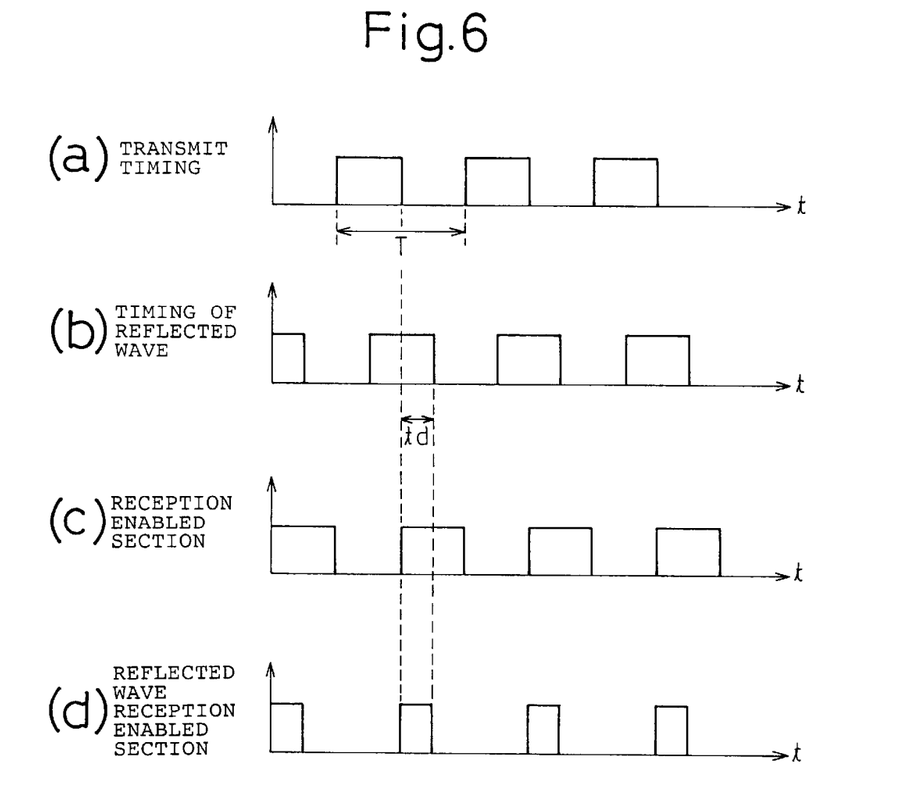
FIGS. 6(a), 6(b), 6(c) and 6(d) are diagrams showing transmit and receive timings for the single-antenna time division control type FM-CW radar.

FIG. 6 is a diagram showing transmit and receive timings for the single-antenna time division control type FM-CW radar. When a signal is transmitted out with the timing of period T as shown in part (a), the return timing of a reflected wave reflected from a target is as shown in part (b). However, the receive timing during which the reflected signal can be received is in the section that does not overlap with the transmit timing (a), as shown in part (c). Accordingly, the timing that the reflected signal can be received is during td, as shown in part (d).

Figure 7:
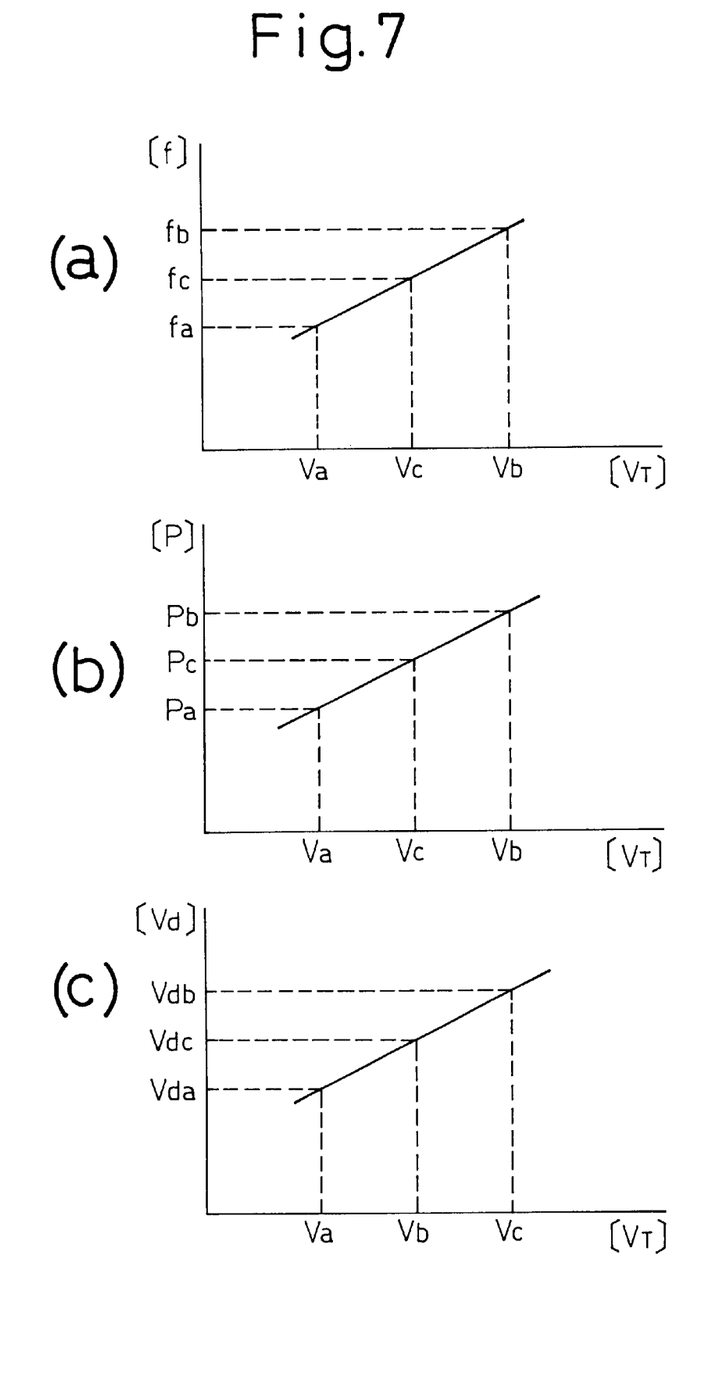
FIGS. 7(a), 7(b) and 7(c) are diagrams showing graphs of output frequency, output power, and voltage generated due to AM detection, plotted as a function of the voltage applied to a voltage-controlled oscillator.

Next, an explanation will be given of how FM-AM conversion noise increases. When applying a modulation to a voltage-controlled oscillator that uses a varactor diode or a voltage-controlled oscillator whose gate voltage is varied, the frequency and power of the signal output from the voltage-controlled oscillator vary depending on the voltage applied to the varactor diode or the gate. FIG. 7 is a diagram showing graphs indicating relationships between the frequency, power, etc. and the voltage applied to the varactor diode or the gate.

As shown in FIG. 7(a), when the voltage $V_T$ applied to the varactor diode or the gate is varied from Vc to Va or Vb, the frequency varies from fc to fa or fb. FIG. 7(b) is a graph indicating a relationship between the voltage $V_T$ and the power. Ideally, the power should remain unchanged, for example, at a constant value Pc. In actuality, however, the power varies from Pc to Pa or Pb.

On the other hand, the voltage Vd generated due to AM detection in the frequency converter varies according to the power P, so that it also varies from Vdc to Vda or Vdb, as shown in FIG. 7(c).

Figure 8:
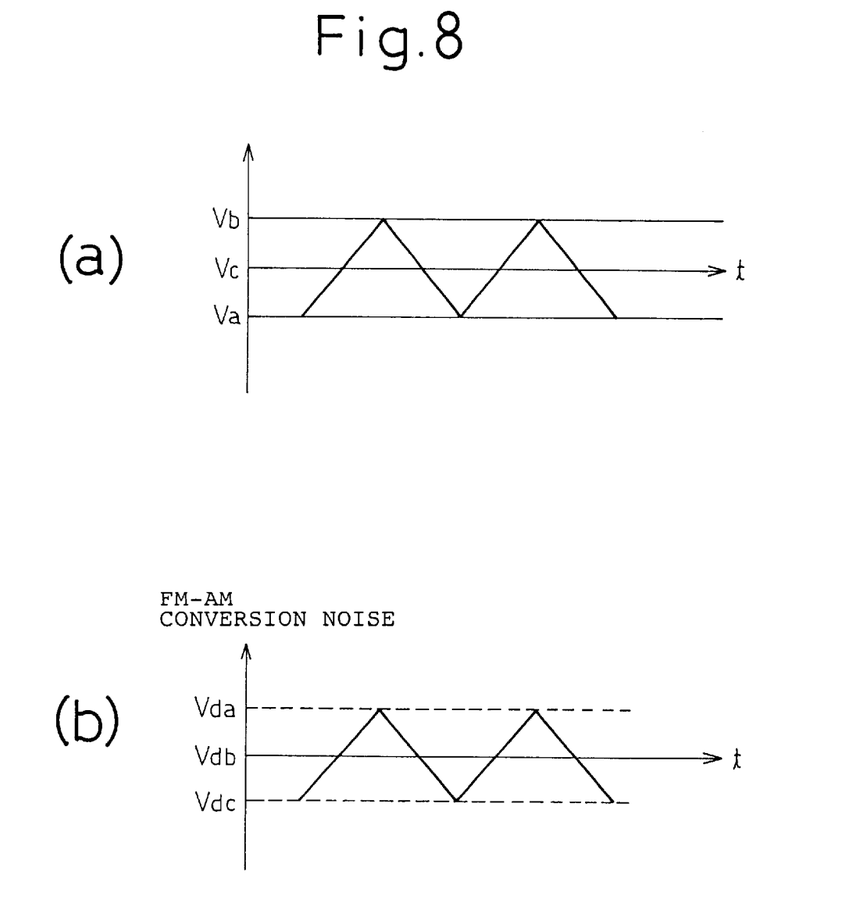
FIGS. 8(a) and 8(b) are diagrams showing the waveform of the signal voltage that a modulating signal generator applies to the voltage-controlled oscillator and the waveform of the voltage generated due to AM detection.

FIG. 8 is a diagram showing the waveform of the signal that the modulating signal generator applies to the voltage-controlled oscillator and the waveform of the voltage Vd generated at that time. As shown in FIG. 8(a), the signal that the modulating signal generator applies to the voltage-controlled oscillator is in the form of a triangular wave. When the signal voltage shown in FIG. 8(a) is applied to the voltage-controlled oscillator, as the power P varies as shown in FIG. 7(b), the waveform of the voltage Vd becomes triangular as shown in FIG. 8(b), and this causes FM-AM conversion noise.

Figure 9:
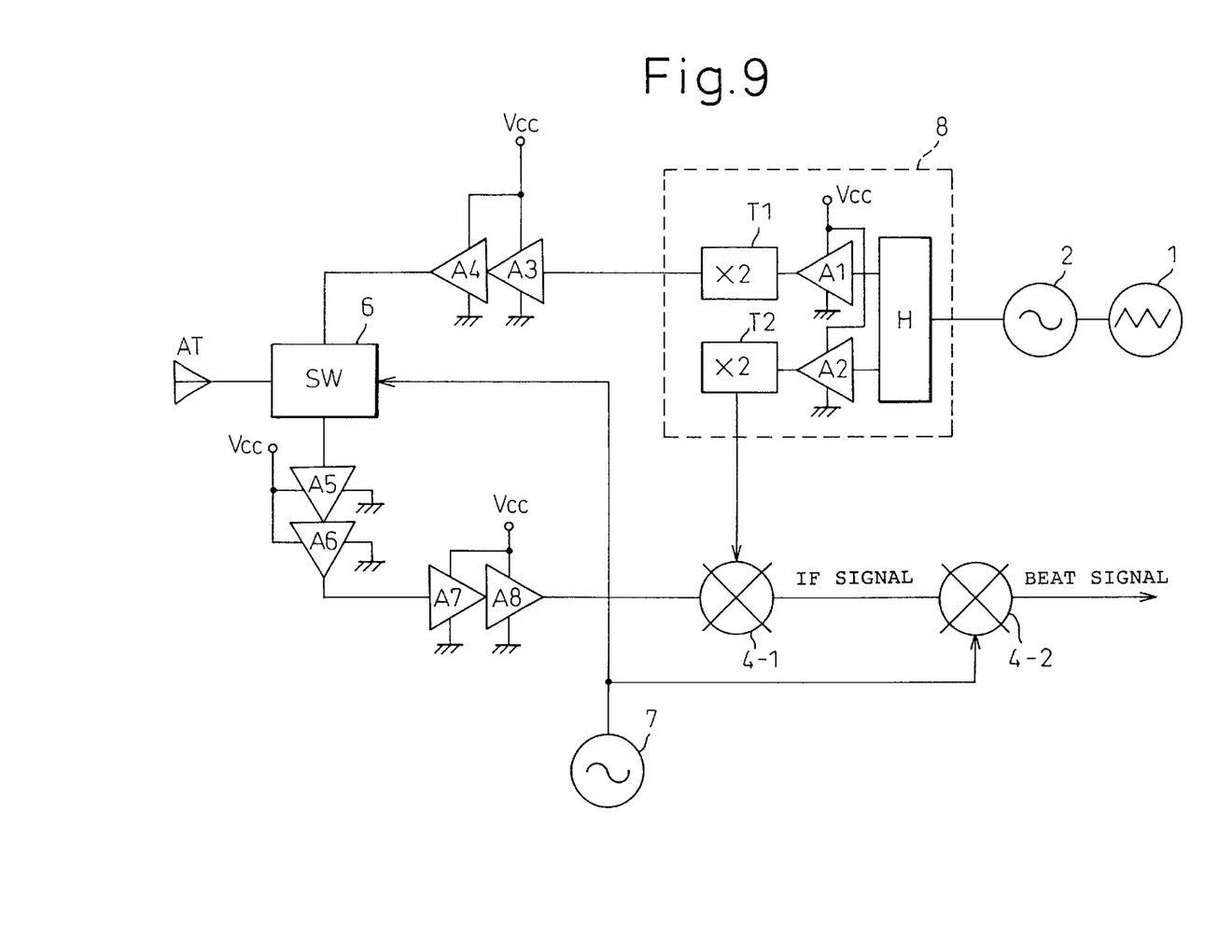
FIG. 9 is a diagram showing one configuration example of the single-antenna time division control type FM-CW radar.

FIG. 9 is a diagram illustrating one configuration example of the single-antenna time division control type FM-CW radar shown in FIG. 4. The modulating signal generator 1 applies a modulating signal to the voltage-controlled oscillator 2 for frequency modulation, and the frequency-modulated signal is input to a local signal separator 8. The frequency-modulated wave is, for example, a signal in the 38 GHz band. The local signal separator 8 comprises a passive device such as a hybrid circuit H, amplifiers A1 and A2, and multipliers T1 and T2, and an output from the hybrid circuit H is passed through the amplifier A1 and multiplier T1 and supplied to amplifiers A3 and A4. The other output from the hybrid circuit H is passed through the amplifier A2 and multiplier T2 and supplied as a local signal to the frequency converter 4-1. Each output from the hybrid circuit H is multiplied by the multiplier T1 and T2 to 76 GHz, for example. The output of the amplifiers A3 and A4 is passed trough the transmit-receive switching section 6 and transmitted from the transmitting/receiving antenna AT. The modulated wave thus transmitted is reflected by a target object such as a vehicle traveling in front, and the reflected wave is received by the antenna AT and input to the frequency converter 4-1 through amplifiers A5/A6 and A7/A8. The input signal is mixed with the local signal output from the multiplier T2, to produce an IF signal. In FIG. 9, Vcc is the power supplied to the amplifiers. Indicated at 7 is the modulating signal generator which generates the modulating signal of frequency fsw for switching the transmit-receive switching section 6. The IF signal output from the frequency converter 4-1 is mixed in the frequency converter 4-2 with the signal of frequency fsw output from the modulating signal generator, and is thus downconverted to produce a beat signal which carries information on the distance and relative velocity of the target object.

The configuration shown in FIG. 9 has a problem that the transmitting power leaks into the receiving system through the transmit-receive switching section 6 because, as previously described, the timing is switched alternately between transmission and reception by the transmit-receive switching section 6. The present invention solves this problem.

Figure 10:
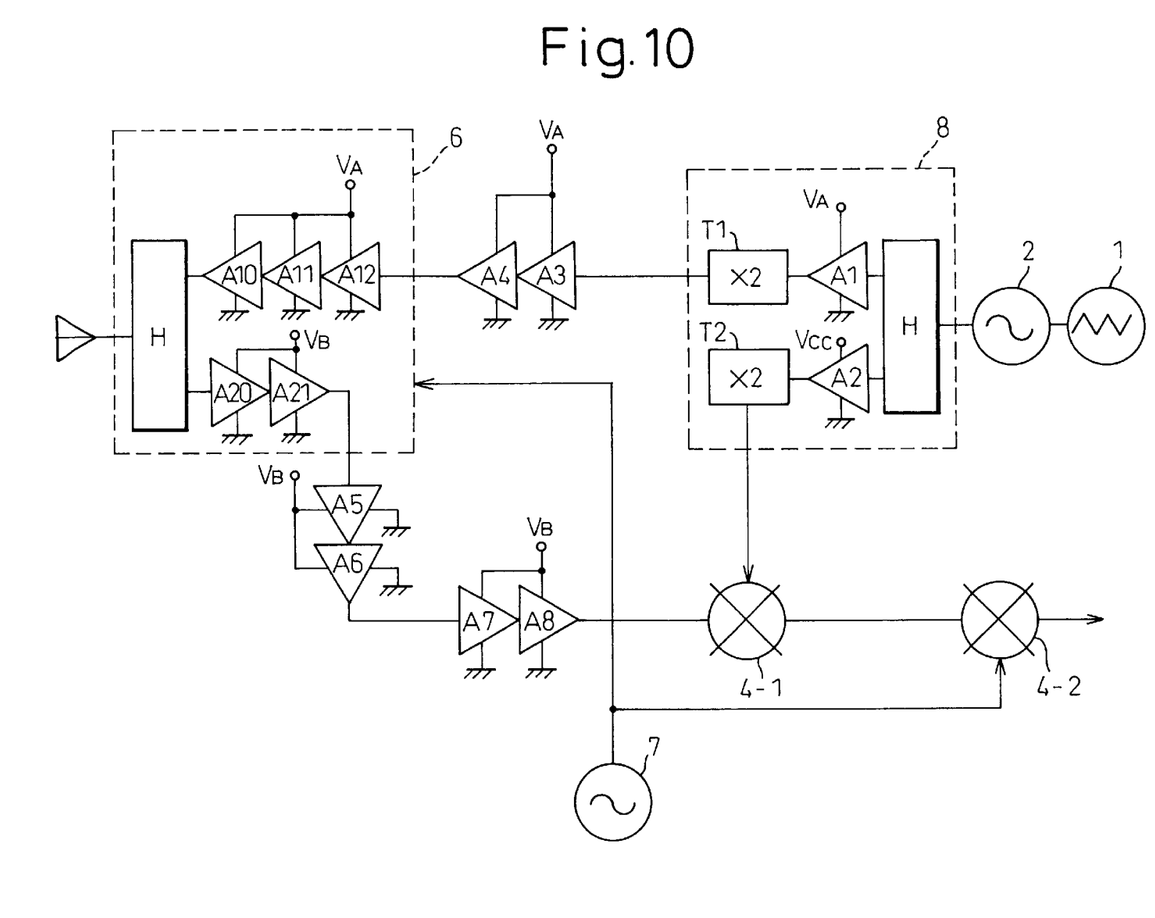
FIG. 10 is a diagram showing the configuration of the single-antenna time division control type FM-CW radar according to the present invention.

FIG. 10 is a diagram showing the configuration of the single-antenna time division control type FM-CW radar according to the present invention. The basic configuration is the same as that shown in FIG. 9, and only differences from FIG. 9 will be described below. In FIG. 10, the transmit-receive switching section 6 comprises transmitting amplifiers A10, A11, and A12, a passive device such as a hybrid circuit H as a duplexer, and receiving amplifiers A20 and A21. In the condition shown, the transmitting amplifiers A1, A3, A4, A10, A11, and A12 are supplied with a bias voltage VA and are thus put in the operating state, i.e., the ON state. On the other hand, the receiving amplifiers A20, A21, A5, A6, A7, and A8 are supplied with a bias voltage VB and are thus put in the non-operating state, i.e., the OFF state. The amplifier A2 is supplied with the normal supply voltage Vcc, and the frequency converter 4-1 is constantly supplied with a local output. The above bias voltages VA and VB are supplied to the transmitting side and receiving side alternately. For example, during transmission, the bias voltage VA is applied to the transmitting amplifiers so that the transmitting amplifiers are caused to operate, and during reception, the bias voltage VA is applied to the receiving amplifiers so that the receiving amplifiers are caused to operate. Therefore, during transmission, the receiving system is off, while during reception, the transmitting system is off, thus separating one from the other and preventing the transmitting power from leaking into the receiving system. In this case, however, the bias voltage need not necessarily be one that turns the amplifiers on and off, the only requirement being that the amplifiers be put in the operating or non-operating state sufficiently to prevent the transmitting power from leaking into the receiving system.

Figure 11:
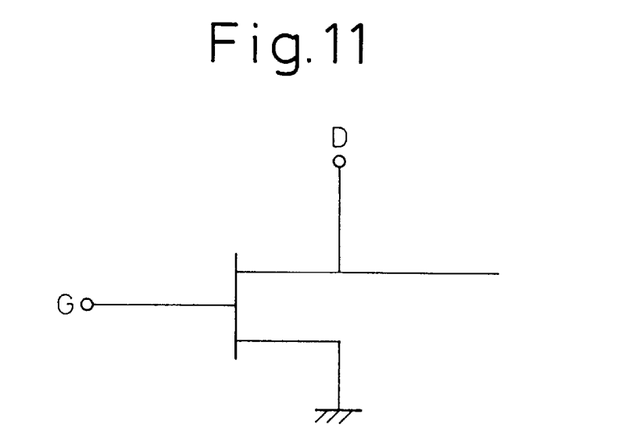
FIG. 11 is a diagram showing one configuration example of an amplifier A.
Figure 12:
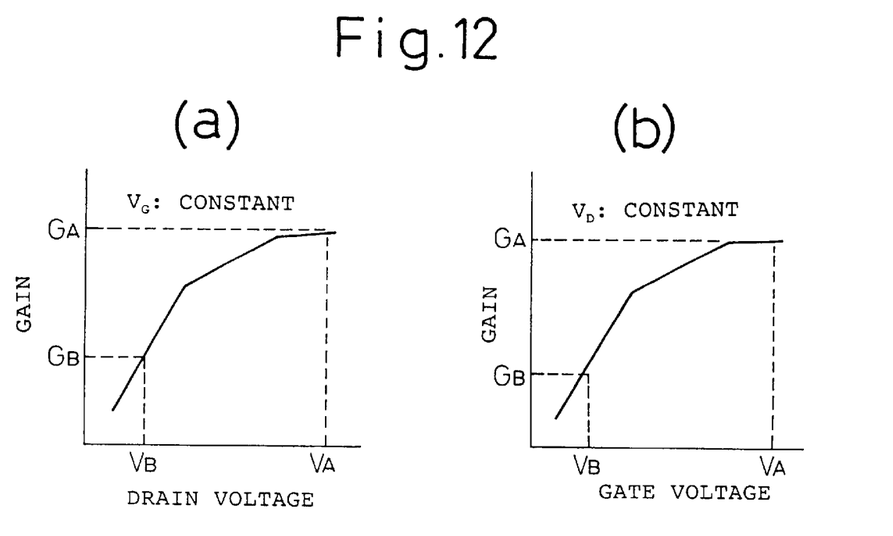
FIGS. 12(a) and 12(b) are diagrams showing graphs depicting how the gain of the amplifier A varies when a bias voltage to gate G or drain D is varied.

FIG. 11 is a diagram showing the configuration of each amplifier A. The signal is input at gate G and output at drain D. FIG. 12 is a diagram showing graphs depicting how the gain of the amplifier A varies when the bias voltage to the gate G or the drain D is varied.

Graph (a) shows how the gain varies when the bias voltage to the drain is varied from $V_B$ to $V_A$ while holding the gate voltage $V_G$ constant. When the bias voltage $V_B$ is applied, the gain is low at $G_B$. At this time, the amplifier A hardly operates and is essentially in the OFF state. On the other hand, when the bias voltage $V_A$ is applied, the amplifier A operates and is thus in the ON state.

Graph (b) shows how the gain varies when the bias voltage to the gate is varied from $V_B$ to $V_A$ while holding the drain voltage $V_D$ constant. When the bias voltage $V_B$ is applied, the gain is low at $_{GB}$. At this time, the amplifier A hardly operates and is essentially in the OFF state. On the other hand, when the bias voltage $V_A$ is applied, the gain is high at $G_A$, so that the amplifier A operates and is thus in the ON state.

As described above, the on/off operation of the amplifier A can be controlled by varying the bias voltage applied to the gate or drain. Accordingly, in FIG. 10, on transmission the bias voltage for the transmitting amplifiers is set to $V_A$ to put them in the ON state, while the bias voltage for the receiving amplifiers A is set to $V_B$ to put them in the OFF state. On reception, the state is reversed; the receiving system and the transmitting system can thus be isolated from each other.

In the configuration shown in FIG. 10, the amplifiers A1 and A2 in the local signal separator 8 are placed in front of the multipliers T1 and T2 so that the amplification is performed at low frequencies before the multiplication. This is because, at lower frequencies, the amplifiers are easier to manufacture and also easier to operate in an on/off fashion.

Further, in the configuration shown in FIG. 10, a plurality of amplifiers are used and connected in a multiple stage configuration, but instead, only one amplifier may be used to serve the same purpose. However, when a plurality of amplifiers are connected in a multiple stage configuration, isolation between the transmitting and receiving sides becomes more reliable and the adjustment easier than when only one amplifier is used. Furthermore, as the amplifiers are provided at a plurality of locations in both the transmitting and receiving systems, the transmitting and receiving systems can be isolated from each other more reliably by simultaneously turning the amplifiers on and off.

In the above embodiment, switching between transmission and reception has been described as being performed using the amplifiers, but the switching between transmission and reception can also be performed on the transmitting side by turning on and off the multiplier Ti in the local signal separator 8 of FIG. 10 in conjunction with the amplifiers. The configuration of the multiplier is the same as that of the amplifier shown in FIG. 11. Its characteristics can also be depicted as shown in FIG. 12. In FIG. 12, however, the magnitude of the voltage plotted along the abscissa is different from that plotted for the amplifier, and further, the ordinate represents the frequency conversion gain whose magnitude is different from that of the gain plotted for the amplifier. The operation of the multiplier is substantially the same as that of the amplifier.

Figure 13:
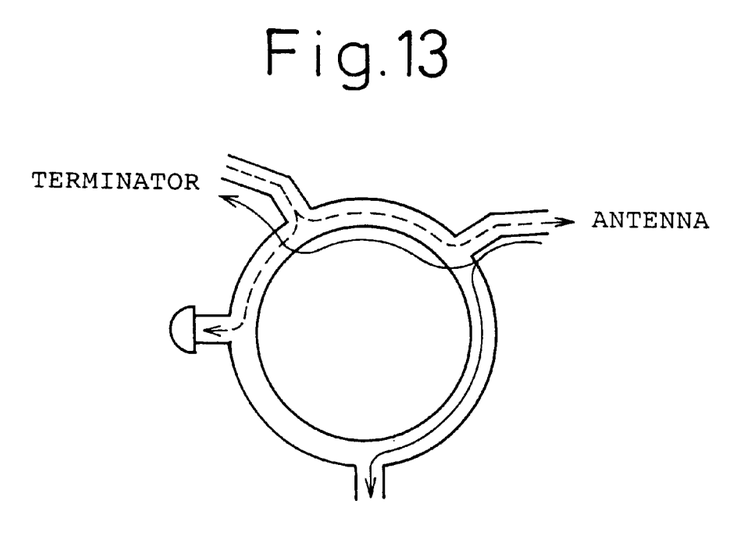
FIG. 13 is a diagram showing an example of a hybrid circuit.
Figure 14:
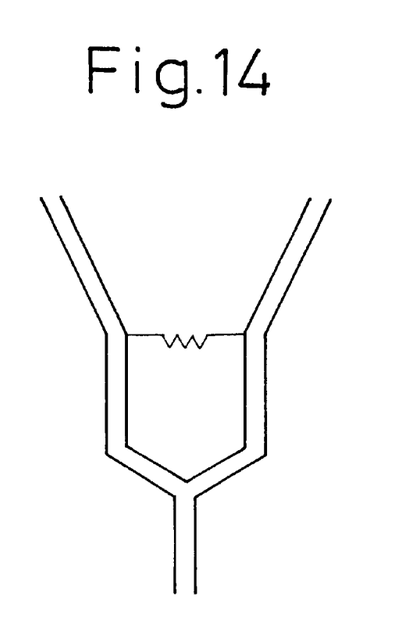
FIG. 14 is a diagram showing an example of a Y-shaped power distributor.
Figure 15:
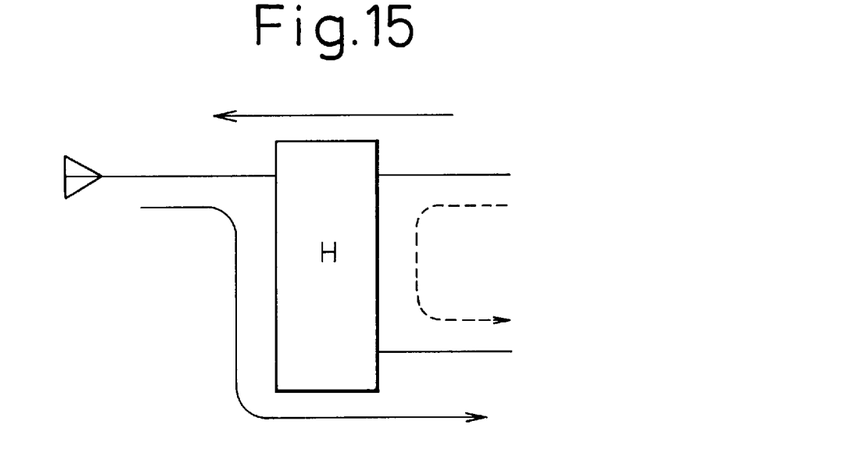
FIG. 15 is a diagram for explaining the occurrence of leakage when the hybrid circuit is used in a transmit-receive switching section.
Figure 16:
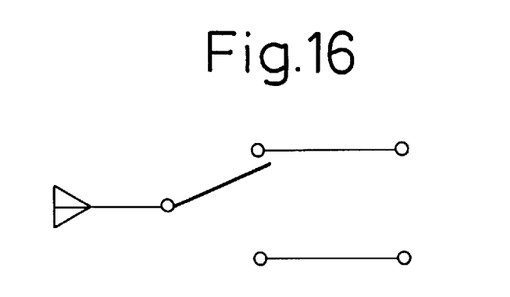
FIG. 16 is a diagram showing an MMIC switch.

Further, a passive device such as a hybrid circuit or a Y-shaped power distributor can be used in the transmit-receive switching section connected to the antenna. An example of the hybrid circuit is shown in FIG. 13, and an example of the Y-shaped power distributor is shown in FIG. 14. The example shown in FIG. 13 is a rat race type hybrid circuit. When the hybrid circuit H is used, for example, leakage occurs as shown by a dashed line in FIG. 15, and sufficient isolation cannot be provided between the transmitting and receiving sides. Therefore, in the conventional art, an MMIC switch such as shown in FIG. 16 has been used to accomplish isolation between the transmitting and receiving sides by turning off the receiving side during transmission and turning on the receiving side when transmission is not performed.

Figure 17:
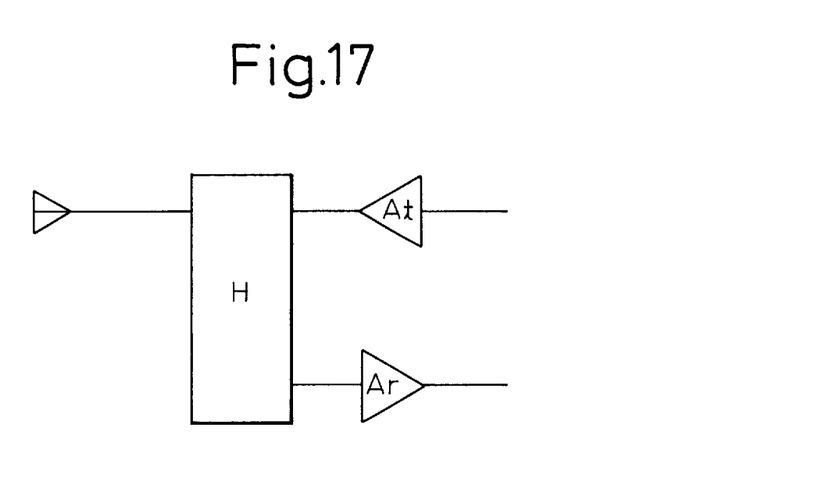
FIG. 17 is a diagram showing a configuration in which the hybrid circuit is used in combination of amplifiers.

However, if the hybrid circuit H cannot provide sufficient isolation between the transmitting and receiving sides, sufficient isolation can be provided between the transmitting and receiving sides, as when the switch is used, by combining the hybrid circuit H with amplifiers as shown in FIG. 17 and by switching between transmission and reception by alternately turning the transmitting amplifier At and receiving amplifier Ar on and off. Accordingly, the hybrid circuit H can be used in the transmit-receive section. The same is true of the Y-shaped power distributor.

What is claimed is:

1. A single-antenna time division control type FM-CW radar which comprises a transmitting/receiving antenna and a transmit-receive switching section and performs switching between transmission and reception by time division, wherein an amplifier is provided in each signal path in a transmitting system and a receiving system, including the transmit-receive switching section, and control means is provided for causing the amplifier provided in the transmitting system and the amplifier provided in the receiving system to operate in synchronism with transmit and receive timings, wherein the switching between transmission and reception is performed by alternately operating the amplifiers, and wherein the operation of the amplifiers is controlled by controlling the gain of each of the amplifiers.

2. A single-antenna time division control type FM-CW radar as claimed in claim 1, wherein the amplifiers are connected in a multiple stage configuration.

3. A single-antenna time division control type FM-CW radar as claimed in claim 1, wherein the amplifiers are provided at a plurality of locations along each signal path in the transmitting system and the receiving system.

4. A single-antenna time division control type FM-CW radar as claimed in claim 1, wherein a passive device is connected as the transmit-receive switching section to the antenna.

5. A single-antenna time division control type FM-CW radar as claimed in claim 4, wherein the passive device is a hybrid circuit or a Y-shaped power distributor.

6. A single-antenna time division control type FM-CW radar which comprises a transmitting/receiving antenna and a transmit-receive switching section and performs switching between transmission and reception by time division, wherein an amplifier is provided in each signal path in a transmitting system and a receiving system, including the transmit-receive switching section, and control means is provided for causing the amplifier provided in the transmitting system and the amplifier provided in the receiving system to operate in synchronism with transmit and receive timings, wherein the switching between transmission and reception is performed by alternately operating the amplifiers, and wherein a multiplier provided in series with the amplifier in a local signal separator provided in the signal path of the transmitting system is operated on and off to perform the switching between transmission and reception in conjunction with the amplifier.

7. A single-antenna time division control type FM-CW radar which comprises a transmitting/receiving antenna and a transmit-receive switching section and performs switching between transmission and reception by time division, wherein an amplifier is provided in each signal path in a transmitting system and a receiving system, including the transmit-receive switching section, and control means is provided for causing the amplifier provided in the transmitting system and the amplifier provided in the receiving system to operate in synchronism with transmit and receive timings, and wherein the control means controls the amplifiers being operated or not being operated by verifying a voltage applied to the amplifiers provided in the transmitting and receiving systems, in which, during transmission, the voltage which causes the amplifier in the transmitting system to operate is applied to the amplifier in the transmitting system and the voltage which causes the amplifier in the receiving system to not operate is applied to the amplifier in the receiving system and, during reception, the voltage which causes the amplifier in the transmitting system not to operate is applied to the amplifier in the transmitting system and the voltage which causes the amplifier in the receiving system to operate is applied to the amplifier in the receiving system.

* * * * *